United States Patent [19]

Matsuda

[11] Patent Number: 5,488,557
[45] Date of Patent: Jan. 30, 1996

[54] ANTI-SKID CONTROLLING SYSTEM AND METHOD FOR AUTOMOTIVE VEHICLE

[75] Inventor: Toshiro Matsuda, Sagamihara, Japan

[73] Assignee: Nissan Motor Co., Ltd., Yokohama, Japan

[21] Appl. No.: 883,017

[22] Filed: May 14, 1992

[30] Foreign Application Priority Data

May 16, 1991 [JP] Japan ................................ 3-139436

[51] Int. Cl.⁶ ............................................... B60T 8/62
[52] U.S. Cl. ................ 364/426.02; 303/146; 303/170; 180/197
[58] Field of Search ................. 303/95, 96, 111, 303/93, 97, 100, 103; 188/181 A; 364/426.01, 426.02, 426.03; 180/197

[56] References Cited

U.S. PATENT DOCUMENTS

| | | | |
|---|---|---|---|
| 4,015,695 | 4/1977 | Pope | 188/181 A |
| 4,783,126 | 11/1988 | Arikawa | 303/96 |
| 5,015,041 | 5/1991 | Kuwana et al. | 303/95 |
| 5,118,168 | 6/1992 | Arikawa | 303/111 |
| 5,140,524 | 8/1992 | Matsuda | 364/426.02 |
| 5,210,690 | 5/1993 | Kageyama et al. | 364/426.02 |
| 5,210,693 | 5/1993 | Kuwana et al. | 364/426.02 |
| 5,233,529 | 8/1993 | Braschel et al. | 364/426.02 |
| 5,241,479 | 8/1993 | Matsuda et al. | 364/426.03 |
| 5,280,432 | 1/1994 | Kuwana et al. | 364/426.02 |

FOREIGN PATENT DOCUMENTS 60-143169  7/1985  Japan.

*Primary Examiner*—Kevin J. Teska
*Assistant Examiner*—Russell W. Frejd
*Attorney, Agent, or Firm*—Foley & Lardner

[57] ABSTRACT

In an anti-skid controlling system and method for an automotive vehicle, the anti-skid control mode is gradually changed from an anti-skid control mode common to each rear tire wheel on the basis of a larger slip rate of both rear tire wheels to an anti-skid control mode for each individual rear tire wheel on the basis of each tire wheel slip rate when the lateral acceleration applied to the vehicle is increased.

6 Claims, 3 Drawing Sheets

ANTI-SKID CONTROLLING SYSTEM AND METHOD FOR AUTOMOTIVE VEHICLE

BACKGROUND OF THE INVENTION (1) Field of the Invention

The present invention relates to an anti-skid controlling system and method applicable to an automotive vehicle and, more particularly, relates to the anti-skid controlling system used for rear tire wheels which can achieve a shortening of a braking distance during a turning or cornering of the vehicle.

(2) Description of the Background Art

A Japanese Patent Application First Publication No. Showa 60-143169 (having a priority based on a German Patent Application No. P 83 21 370.4) published on Jul. 29, 1985 exemplifies an anti-skid control system in which a lateral acceleration is detected and a limitation of a braking liquid pressure is changed or released when a predetermined lateral acceleration is imposed on its vehicle body.

On the other hand, when a slip rate of a tire wheel of an automotive vehicle exceeds a set slip rate during a vehicle braking, a braking force of the vehicle (usually a braking pressure) is limited by means of an anti-skid actuator so as to prevent the tire wheel from being locked. The set slip rate is determined to be in the proximity to an ideal slip rate which provides a maximum frictional coefficient between the corresponding tire wheel and a road surface so that the vehicular braking distance gives a shortest distance.

Furthermore, when the anti-skid control for right and left rear tire wheels is carried out and the braking force difference is present due to the difference in the road surface frictional coefficient between the rear right and left tire wheels since the rear right and left tire wheels are not steered, the vehicle becomes spun. Hence, it is usual that the anti-skid control is carried out commonly to both rear right and left tire wheels on the basis of data on the slip rate from one of the rear tire wheels on which the slip rate is larger (i.e., its tire wheel is locked earlier).

In the case of the common anti-skid control for both right and left tire wheels described above, the braking forces on both rear tire wheels are mutually the same and their braking forces are referenced to one of the rear tire wheels at which the earlier lock occurs (easier to be locked).

Therefore, during the vehicular turning or cornering and the vehicular braking, a weight applied to an outer rear wheel is made heavier than that applied to an inner rear wheel so that the outer rear wheel is made difficult to be locked than the inner rear wheel. However, since the anti-skid control common to both rear inner and outer wheels is carried out, the braking force applied to the outer rear wheel is suppressed below a naturally generated value of braking force. Hence, the braking force for the whole vehicle is accordingly reduced and the braking distance becomes elongated.

SUMMARY OF THE INVENTION

It is, therefore, a main object of the present invention to provide improved anti-skid controlling system and method for an automotive vehicle in which during the turning and/or cornering the anti-skid controls for the individual rear right and left tire wheels are carried out according to a lateral acceleration generated during the turn and/or cornering of the vehicle.

The above-described object can be achieved by providing an anti-skid controlling system for a vehicle, comprising: a) first sensing means for detecting rotation speeds of respective tire wheels and outputting detection signals indicative of the rotation speeds of the respective tire wheels; b) second sensing means for detecting a lateral acceleration applied onto a vehicular body and outputting a lateral acceleration signal indicative of the lateral acceleration; c) third means for determining whether either one of slip rates on right and left rear tire wheels exceeds a set slip rate on the basis of the rotation speed signals of the tire wheels; d) fourth means for operatively limiting a braking force imposed on each rear tire wheel when either one of the slip rates exceeds the set slip rate; and e) fifth means for switching from one anti-skid control mode in which the anti-skid control is commonly carried out for both rear tire wheels on a basis of the slip rate data derived from one of the rear tire wheels which provides a larger slip rate to the other anti-skid control mode in which the anti-skid control is individually carried out for the respective rear tire wheels on a basis of each slip rate data derived from each one of the rear tire wheels as the lateral acceleration becomes increased.

The above-described object can also be achieved by providing an anti-skid controlling method for a vehicle, comprising the steps of: a) detecting rotation speeds of respective tire wheels and outputting detection signals indicative of the rotation speeds of the respective tire wheels; b) detecting a lateral acceleration applied onto a vehicular body and outputting a lateral acceleration signal indicative of the lateral acceleration; c) determining whether either one of slip rates on right and left rear tire wheels exceeds a set slip rate on the basis of the rotation speed signals of the tire wheels; d) operatively limiting a braking force imposed on each rear tire wheel when either one of the slip rates exceeds the set slip rate; and e) switching from one anti-skid control mode in which the anti-skid control is commonly carried out for both rear tire wheels on a basis of the slip rate data derived from one of the rear tire wheels which provides a larger slip rate to the other anti-skid control mode in which the anti-skid control is individually carried out for the respective rear tire wheels on a basis of each slip rate data derived from each one of the rear tire wheels as the lateral acceleration becomes increased.

DETAILED DESCRIPTION OF THE PREFERRED EMBODIMENTS

Reference will hereinafter be made to the drawings in order to facilitate a better understanding of the present invention.

Figure 1:
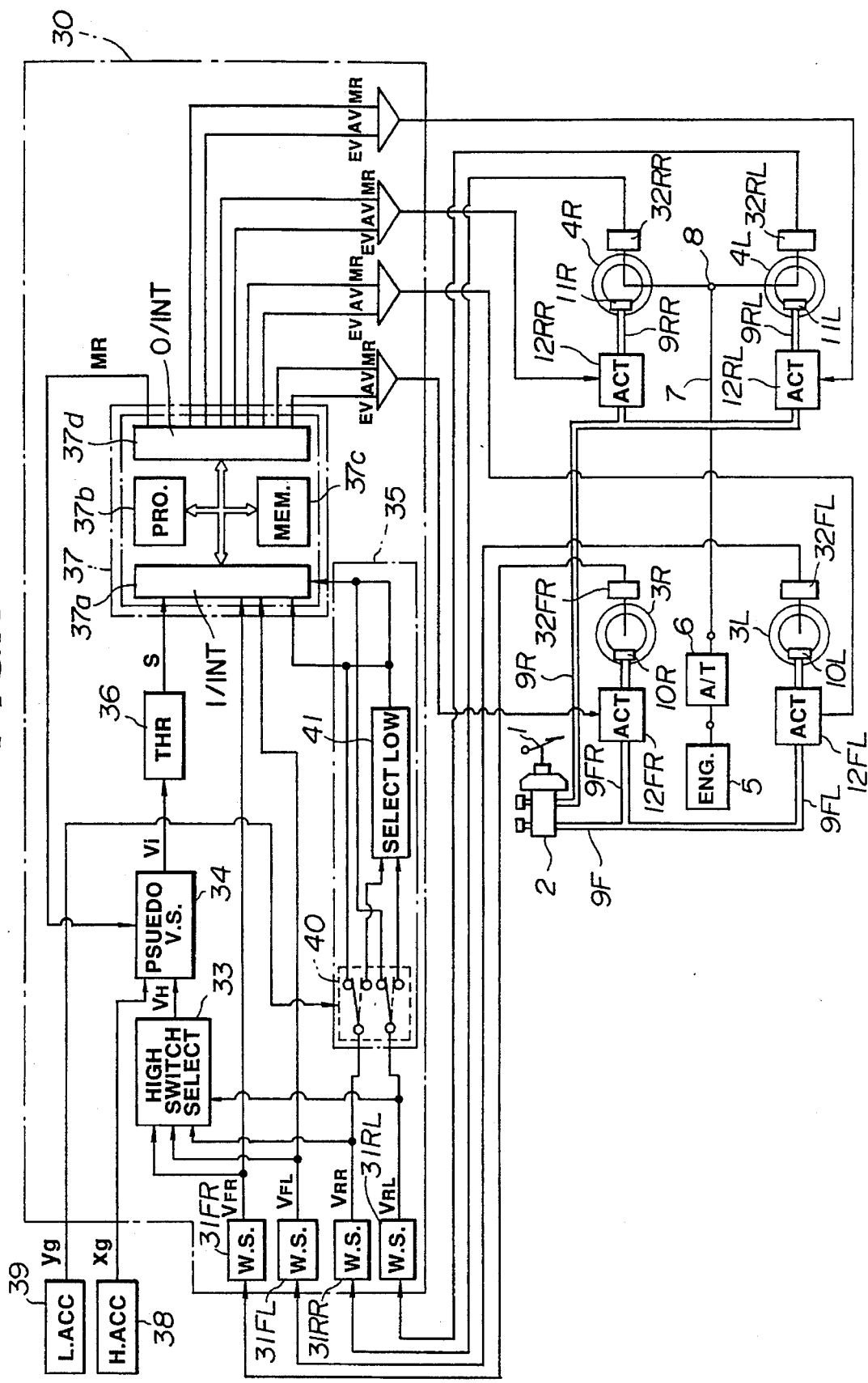
FIG. 1 is a system configuration of an anti-skid controlling system in a preferred embodiment according to the present invention.

FIG. 1 shows a preferred embodiment of an anti-skid controlling system according to the present invention.

In FIG. 1, numeral 1 denotes a brake pedal of the vehicle to which the preferred embodiment is applicable, 2 denotes a brake master cylinder, 3L and 3R denote right front tire wheel and left front tire wheel, 5 denotes an engine, 6 denotes an automatic transmission, 7 denotes a propeller shaft, 8 denotes a differential gear, respectively.

The engine 5 serves to run the vehicle driving rear left and right tire wheels 4L, 4R via the transmission 6, propeller shaft 7, and differential gear 8. The vehicle driver depresses the brake pedal when the braking for the vehicle is needed.

In response to the depression of the brake pedal 1, a master cylinder 2 outputs a master cylinder liquid pressure corresponding to a pedal depression force to two braking systems 9F, 9R.

A front tire wheel braking pedal system 9F is branched into two braking systems 9FL and 6FR to operate right and left front tire wheel cylinders 10L and 10R so that the right and left front tire wheels are braked. A rear tire wheel braking system 9R is branched into two systems 9RL and 9RR to operate right and left tire wheel cylinders 11L and 11R so that the right and left tire wheels are braked.

Those described above constitute a normal liquid pressure braking system. On the other hand, anti-skid actuators 12FL, 12FR, 12RL, 12RR are inserted into the systems 9FL, 9FR, 9RL, and 9RR, respectively. These serve to execute anti-skid controls individually for left front tire wheel 3L, right front tire wheel 3R, left rear tire wheel 4L, and right rear tire wheel 4R.

Figure 2:
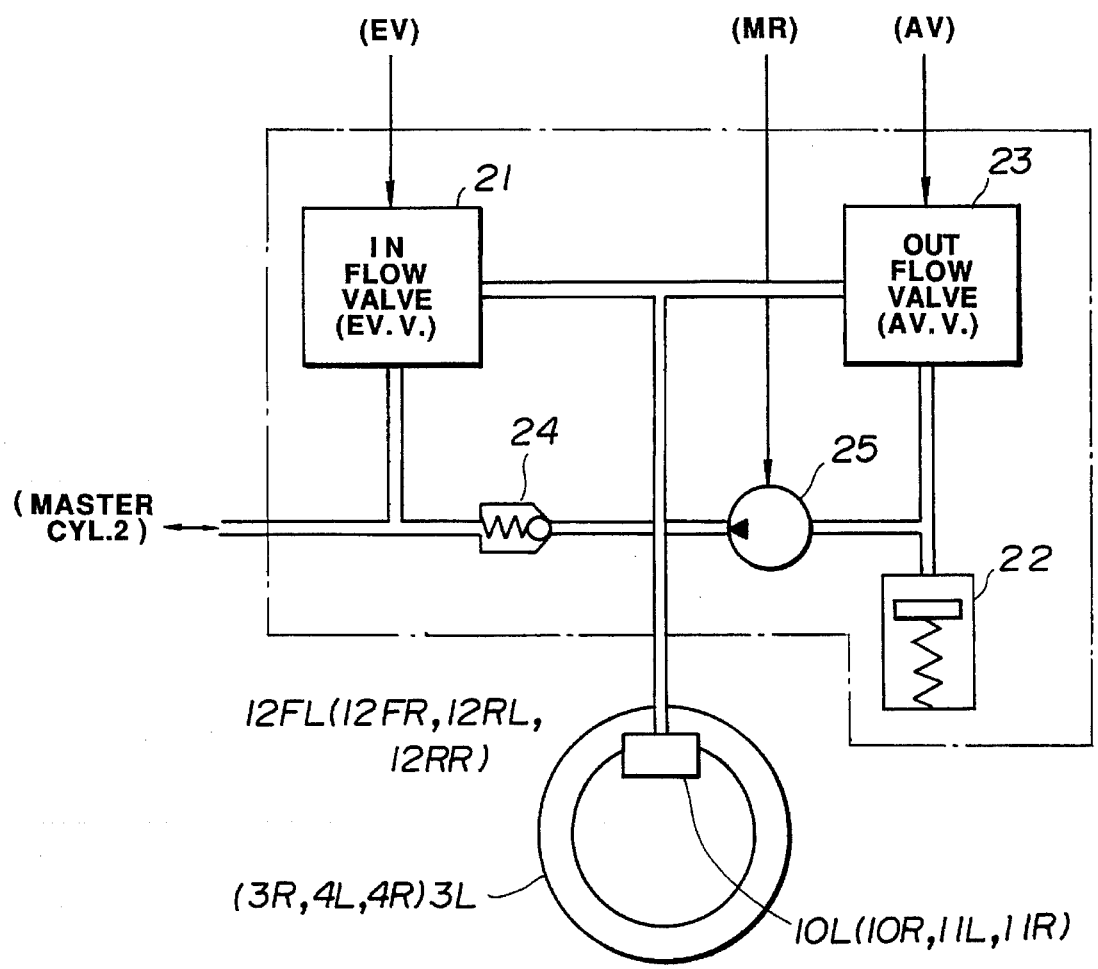
FIG. 2 is an explanatory view of an anti-skid actuator shown in FIG. 1.

The anti-skid actuators described above 12FL, 12FR, 12RL, and 12RR have all the same structures as representatively shown in FIG. 2.

These serve individually to carry out the controls for liquid pressures (braking pressures) supplied to the wheel cylinders 10L, 10R, 11L, and 11R from the master cylinder 2.

Each anti-skid actuator includes: a normally open flow inlet valve (EV valve) 21 which serves to supply the liquid pressure from the master cylinder to the wheel cylinder so as to increase the braking liquid pressure; a normally closed flow outlet valve (AV valve) 23 which serves to exhaust the liquid pressure in the wheel cylinder appropriately into an accumulator 22 so as to reduce the liquid pressure in the wheel cylinder; and a pump 25 which serves to return the pressure in the accumulator 22 to the master cylinder 2 via a check valve 24.

It is noted that the EV valve 21 is closed in response to an EV signal to halt the increase in the braking liquid pressure during its turn ON by the EV signal, the AV valve 23 is open in response to an AV signal to reduce the braking pressure during its turn ON by the AV signal, and the pump 25 is driven during a supply of an MR signal thereto.

Each actuator, thus, serves to hold the braking liquid pressure at its value when the EV signal causes the EV valve 21 to turn ON and when the AV valve 23 is normally closed, serves to reduce the braking liquid pressure when the AV signal causes the AV valve 23 to turn ON and the pump 25 is driven in response to the MR signal, and causes the braking liquid pressure to be increased toward liquid pressure from the master cylinder when the EV valve 21 is turned OFF to be open and the AV valve 23 is turned OFF to be closed.

Referring to FIG. 1, a controller 30 for each anti-skid actuator includes tire wheel speed calculation circuits 31FL, 31FR, 31RL, and 31RR. The calculation circuit 31FL derives a left front tire wheel speed $V_{FL}$ on a basis of a pulse train signal output from a left front tire wheel rotation speed sensor 32FL. The calculation circuit 31FR derives a right front tire wheel speed $V_{FR}$ on a basis of a pulse train signal output from a right front tire wheel rotation speed sensor 32FR. The calculation circuit 32RL derives a right front tire wheel speed $V_{RL}$ on a basis of a pulse train signal output from a left rear tire wheel rotation speed sensor 32RL. The calculation circuit 32RR derives a right rear tire wheel $V_{RR}$ on a basis of a pulse train signal output from a right rear wheel rotation sensor 32RR.

The controller 30 further includes a select high switch 33, a pseudo vehicle speed calculation circuit 34, a rear tire wheel anti-skid control mode changing block 35, a threshold setting circuit 36, and a braking liquid pressure control circuit 37.

The SELECT HIGH switch 33 selects a highest tire wheel speed approximate to the current vehicle speed from among the tire wheel speeds $V_{FL}$, $V_{FR}$, $V_{RL}$, and $V_{RR}$ as a select high tire wheel speed $V_H$ and inputs it to the pseudo vehicle speed calculation circuit 34. The circuit 34 produces a pseudo vehicle speed $V_i$ simulated as an actual vehicle speed from a deceleration $X_g$ of the vehicle detected by means of a longitudinal acceleration sensor 38 and MR signal which takes a logical OR of the MR signals supplied to the actuators 12FL, 12FR, 12RL, and 12RR. This pseudo vehicle speed $V_i$ is input as the vehicle speed signal to the threshold setting circuit 36 which drives a target value S common to the right front and left front tire wheel speeds and right rear and right left rear tire wheel speeds and the target value S is input to the liquid pressure controlling circuit 37. When each tire wheel speed is below the target value S, a slip rate of the corresponding tire wheel to the vehicle speed $V_i$ is determined to exceed a set slip rate so that the corresponding tire wheel can be deemed to be under the anti-skid control.

It is noted that the tire wheel speed target value S is generally derived as $S=V_1 \times 0.85 - 4$ Km/h since an ideal slip rate which maximizes a friction coefficient onto a road surface when it is about 0.15.

The rear tire wheel anti-skid control mode changing block 35 includes a lateral acceleration responsive exchange switch 40 which responds to the lateral acceleration $y_s$ detected by means of the lateral acceleration sensor 39 and a SELECT LOW switch 41.

The rear tire wheel anti-skid control mode changing block 35 determines how the right and left rear tire wheel speeds $V_{RL}$ and $V_{RR}$ should be selected as the right and left tire wheel speed data for the anti-skid control purposes.

The exchange switch 40 is placed in a broken line position in response to the lateral acceleration $y_g$ detected by means of the lateral acceleration sensor 39 when lateral acceleration is below a set value, e.g., 0.4 g so that a lower speed of the right and left tire wheel speeds $V_{RL}$ and $V_{RR}$ is selected by means of the SELECT LOW switch 41 and is input to the braking liquid pressure control circuit 37 as a common rear tire wheel speed signal. On the other hand, when the exchange switch 40 is placed in a solid line position when the lateral acceleration is over 0.4 g, the right and left rear tire wheel speeds $V_{RL}$ and $V_{RR}$ are directly input to the liquid pressure control circuit 37 as individual left and right rear tire wheel speed signals.

The braking liquid pressure control circuit 37 includes an input interface circuit 37a, a calculation processing unit 37b, a memory 37c, and output interface circuit 37d. The input interface circuit 37a retrieves the right and left front tire wheel speeds $V_{RL}$, $V_{RR}$, right and left rear tire wheel speeds $V_{RL}$, $V_{RR}$ selected by the rear tire wheel anti-skid control mode changing block 35, the target tire wheel speed value S common to the respective tire wheels. The calculation processing unit 37b individually determines whether each tire wheel is below the target value S, i.e., whether each tire wheel is in a tire wheel speed state to be under the anti-skid control. The output interface circuit 37d outputs individually to the respective actuators 12FL, 12FR, 12RL, and 12RR the EV signal, AV signal, and MR signal according to the result of determination by the calculation processing unit 37b.

The braking liquid pressure control circuit 37 carries out the anti-skid control individually for the left front tire wheel 3L, right front tire wheel 3R, left rear tire wheel 4L, and right rear tire wheel 4R. For both rear tire wheels, the right and left rear tire wheel speed data to be used as input(s) for the anti-skid control are selected as described below as the rear anti-skid control mode changing block 35. In details, the lateral acceleration responsive switch 40 is placed as denoted by the broken line so that the left and right rear tire wheel speeds $V_{RL}$, $V_{RR}$ are input to the SELECT LOW switch 41 when the vehicle goes straight with the lateral acceleration $y_g$ below 0.4 g so that the lower speed value thereof is input to the braking liquid pressure control circuit 37 as the right and left rear tire wheel speed data common to both rear tire wheels for the anti-skid control. Thus, during vehicle operation at low lateral acceleration, both right and left rear tire wheels are commonly under the anti-skid control on the basis of the data of the tire wheel speed (slip rate) from the rear tire wheel which has the larger slip rate. Even if the road surface friction coefficients of the right and left rear tire wheels are different from each other, the braking forces of the right and left rear wheels are equalized so as to avoid occurrence of spinning wheels.

When the vehicle turns, the lateral acceleration exceeds 0.4 g, and the switch 40 is placed at the solid line position so that the right and left rear tire wheel speeds $V_{RL}$. $V_{RR}$ are individually and directly input into the braking liquid pressure control circuit 37 as the right and left rear tire wheel speed data for the anti-skid control. Thus, when the vehicle turns under large lateral acceleration, the right and left rear tire wheels are individually under the anti-skid controls on the basis of the respective tire wheel speeds. Consequently, the outer rear tire wheel with respect to the turn direction can generate a large braking force which meets the increase in weight thereon so that the braking distance can be shortened.

In this way, since the braking force on the outer rear tire wheel becomes larger than the inner rear tire wheel, a yaw moment in a direction suppressing the spinning during the turn of the vehicle can be achieved and stability can be increased.

In the above-described embodiment, depending on whether the lateral acceleration $y_g$ is larger than the threshold value (0.4 g) determines whether anti-skid control for both the right and left tire wheels is performed commonly or whether the anti-skid control is performed individually.

In the first embodiment, an abrupt stepwise difference between the right and left rear tire wheel braking forces is created such that the vehicle driver feels an unpleasant feeling.

To prevent such an abrupt difference in the braking forces, it is favorable to gradually change the anti-skid control mode according to the magnitude of lateral acceleration.

Figure 3:
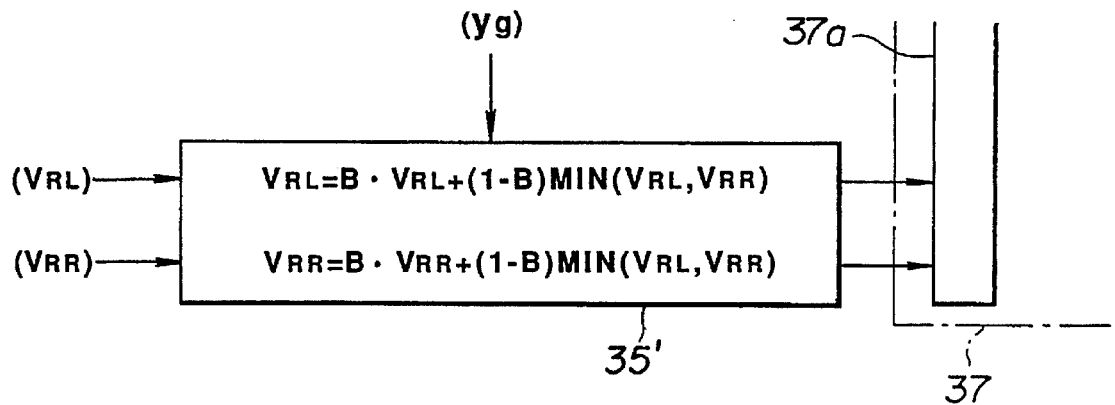
FIG. 3 is a partial explanatory view of the anti-skid controlling system in another preferred embodiment according to the present invention.

FIG. 3 shows the other preferred embodiment of the anti-skid controlling system according to the present invention.

In the other preferred embodiment shown in FIG. 3, the rear tire wheel anti-skid control mode changing block 35' defines the anti-skid controlling left rear tire wheel speed $V_{RL}$ data as $B.V_{RL} + (1-B)\text{MIN}(V_{RL}, V_{RR})$ and defines the anti-skid controlling right rear tire wheel speed $V_{RR}$ data as $B.V_{RR} + (1-B)\text{MIN}(V_{RL}, V_{RR})$, both rear tire wheel speeds being on the basis of a variable B related to the lateral acceleration $y_g$.

It is noted that the term $\text{MIN}(V_{RL}, V_{RR})$ means that a value lower than the other of $V_{RL}$ and $V_{RR}$ is selected and, hence, if $y_g=0$, B=0 so that the right and left rear tire wheels are under common anti-skid control with the value of MIN $(V_{RL}, V_{RR})$ as the tire wheel speed data. If $y_g=y_{g1}$, B=1 so that the respective rear tire wheels are individually under the respective anti-skid controls with the corresponding rear tire wheel speeds as the rear tire wheel speeds $V_{RL}$, $V_{RR}$.

When the value of $y_g$ falls in-between 0 and $y_{g1}$, the variable B becomes large as the $y_g$ becomes large. Therefore, the change from the common control to the individual controls can be carried out gradually as the lateral acceleration is increased.

Figure 4:
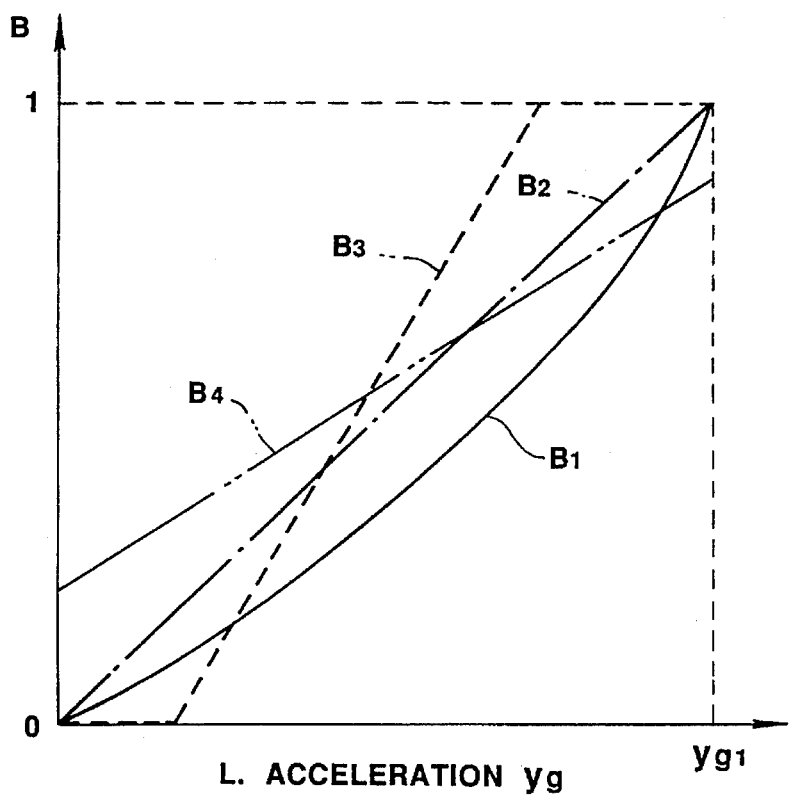
FIG. 4 is a characteristic graph of a variable used in the anti-skid controlling system in the other preferred embodiment shown in FIG. 1.

It is noted that the variable B may be changed linearly with respect to the lateral acceleration $y_g$ as denoted by $B_2$ of FIG. 4, may have an offset value as denoted by $B_4$ of FIG. 4, or may have values of 0 and 1 in a small region of the lateral acceleration $y_g$ and in a large region thereof.

As described herein above, since in the anti-skid control system according to the present invention the common anti-skid control of both rear tire wheels is carried out on the basis of the slip rate of one of the rear tire wheels that has a larger slip rate when large lateral acceleration occurs and is changed to the individual anti-skid control on the basis of the slip rates of the respective rear tire wheels, the braking force on the outer rear tire wheel in the turning direction of the vehicle is large according to the increase in the emphasis so that the braking distance can be shortened.

If the change of the anti-skid control mode between the common anti-skid control and the individual anti-skid control is carried out gradually according to the increase in the lateral acceleration, no abrupt difference or coincidence of the braking forces on both rear tire wheels can detected and the vehicle driver's unpleasant feeling of braking can be eliminated.

It will fully be appreciated from those skilled in the art that the foregoing description is made in terms of the preferred embodiments and various changes and modifications may be made without departing from the scope of the present invention which is to be defined by the appended claims.

What is claimed is:

1. An anti-skid controlling system for a vehicle, comprising:

a) first sensing means for detecting rotation speeds of respective tire wheels and outputting detection signals indicative of the rotation speeds of the respective tire wheels;

b) second sensing means for detecting a lateral acceleration of a vehicular body and outputting a lateral acceleration signal indicative of the lateral acceleration;

c) third means for determining whether either one of slip rates of right and left rear tire wheels exceeds a set slip rate on the basis of the rotation speed signals for the tire wheels;

d) fourth means for operatively limiting a braking force imposed on each rear tire wheel when either one of the slip rates exceeds the set slip rate; and e) fifth means for switching from a common anti-skid control mode in which the anti-skid control is commonly carried out for both rear tire wheels on a basis of the slip rate data derived from one of the rear tire wheels which provides a larger slip rate to an independent anti-skid control mode in which the anti-skid control is individually carried out for the respective rear tire wheels on a basis of each slip rate data derived for each one of the rear tire wheels as the lateral acceleration becomes increased, wherein said fifth means switches between the common anti-skid control mode and the independent anti-skid control mode when the lateral acceleration becomes increased and wherein the data of the left rear tire wheel speed $V_{RL}$ is defined as $B \cdot V_{RL}+(1-B)MIN(V_{RL}, V_{RR})$ and the data of the right rear tire wheel speed $V_{RR}$ is defined as $B \cdot V_{RR}+(1-B)MIN(V_{RL}, V_{RR})$, wherein B denotes a variable representing lateral acceleration $y_g$ and $MIN(V_{RL}, V_{RR})$ denotes the rotation speed value selected from the lower of $V_{RL}$ and $V_{RR}$ such that the switching from the common anti-skid control for both rear tire wheels to the independent anti-skid control for each of both rear tire wheels is gradually carried out in response to the increase in the magnitude of lateral acceleration.

2. An anti-skid controlling system for a vehicle as set forth in claim 1, wherein said third means sets the set slip rate in the form of a target value S which is used as the target value for each tire wheel rotation speed and said third means determines that the slip rate for the right and left rear tire wheels exceeds the set slip rate when either one of the rotation speeds of the rear tire wheels is below the target value S.

3. An anti-skid controlling system for a vehicle as set forth in claim 2, wherein said third means calculates the set slip rate as the target value S as follows:

S=Vi×0. 85 - 4 (Km/h), wherein Vi denotes a pseudo vehicle speed, and wherein said third means includes a SELECT HIGH switch which selects a highest speed value from among the respective tire wheel rotation speeds, the pseudo vehicle speed being calculated on the basis of the highest tire wheel rotation speed.

4. An anti-skid controlling system for a vehicle as set forth in claim 3, wherein said fourth means includes a plurality of anti-skid actuators which control individually braking liquid pressures from a master cylinder to respective wheel cylinders.

5. An anti-skid controlling system for a vehicle as set forth in claim 4, which further includes a vehicle deceleration sensor which detects a vehicle deceleration $x_g$ and wherein the pseudo vehicle speed Vi is calculated from the highest tire wheel rotation speed selected by the SELECT HIGH switch, an MR signal as the result of logical OR of the MR signals supplied to a pump in each anti-skid actuator, and vehicle deceleration $x_g$.

6. An anti-skid controlling system for a vehicle as set forth in claim 1, wherein the vehicle is a front engine rear drive type.

* * * * *